INVENTOR.
JULIUS H. BOCHINSKI

BY Martin E Gerry

AGENT

FLUSHING
FLUID
DUMP

INVENTOR.
JULIUS H. BOCHINSKI
BY Martin E Gerry
AGENT

April 4, 1972   J. H. BOCHINSKI   3,654,113
PROGRAMMED FLUID SAMPLING AND ANALYSIS APPARATUS
Filed Nov. 24, 1969   9 Sheets-Sheet 8

*INVENTOR.*
JULIUS H. BOCHINSKI
BY Martin E Gerry
AGENT

United States Patent Office 3,654,113
Patented Apr. 4, 1972

3,654,113
PROGRAMMED FLUID SAMPLING AND ANALYSIS APPARATUS
Julius H. Bochinski, La Habra, Calif., assignor to North American Rockwell Corporation, El Segundo, Calif.
Filed Nov. 24, 1969, Ser. No. 879,055
Int. Cl. G01n 27/00, 27/28
U.S. Cl. 204—195 R       16 Claims

ABSTRACT OF THE DISCLOSURE

The programmed fluid sampling and analysis apparatus and method includes programmer controlled sampling of a fluid stream in order to subject the fluid to automated analysis of the ion concentrations of the chemicals of the fluid. A flushing fluid and an electrolyte fluid are programmed through the apparatus impelled by a gas which ultimately mix in a vessel wherefrom the mixtures are analyzed by specific element-ion sensitive probes connected to electronic amplifying and recording equipment. A programmed analysis of each specific probe output is provided on a strip chart recorder and the ion concentrations are determined by reading the steady state values of the recorded and amplified outputs of each of the specific element-ion sensitive probes.

BACKGROUND OF THE INVENTION

Other apparatuses for sampling fluid streams have been devised, however, the various apparatuses used did not involve programmed sampling and analysis of the fluid stream and embodied certain disadvantages.

Wherein sampling of discrete quantities of the fluid stream were taken: (1) the sampling valves of the apparatus failed because solids were precipitated on the valve surfaces as the fluids passed through the valves; (2) the sampling valves used failed after the solids were deposited therein at gas entryways to the valves thereby blocking these entryways; and (3) wherein a gas only was used to drive out an aliquot of the fluid stream, loss of a good portion of the aliquot on the walls of the valve resulted, thereby causing crystallization of the chemicals of the aliquot within the valve with attendant blockage of the system to the flow of fluids therethrough.

Wherein a continuous process stream type sampling apparatus was used: (1) substantial volume rates (1 to 10 cc./min.) of the fluid stream were required, thereby wasting a substantial portion of the process stream in the form of the discarded sample; (2) lack of flexibility of using a variety of fluid streams, flushing fluid and electrolyte fluid ratios resulted in limitation in the dynamic range of the system or in the limitation in the type of detection devices that could be used; (3) fluid transfer devices such as peristaltic pumps or piston pumps were commonly used which underwent greater wear during continuous use; and (4) wherein pumps with slider valves were used, the slider valves became scarred when the liquid film evaporated on the valve faces leaving crystalline solids deposited thereon.

INVENTION SUMMARY

Objectives

It is therefore an objective of this invention to utilize a programmer in conjunction with sampling valves and measurement instrumentation for programming an aliquot of a stream of fluid and several other fluids through the system and provide sequencing of the measurement instrumentation in a special discrete sampling technique.

It is another objective of the invention to utilize such sampling valves and fluids in the system that would prevent failure to the valves due to chemical precipitation in the valves.

It is still another objective of this invention to prevent failure of the valves by purging the entryways thereof.

It is yet another objective of this invention to prevent loss of the portions of the aliquot on the valve walls when a gas is used to drive the aliquot by enabling the use of small aliquot volume rates, in the order of $10^{-3}$ cc. per analysis sample, thereby preventing crystallization of the aliquot chemicals within the valve due to the small volumes used and the high drive rate through the system.

Further advantages include wide dilution ratios ranging for example between 10,000:1 and 1:1 of the stream of fluid or the process steam aliquot. The fluid stream sample volume may also be varied from $10^{-3}$ cc. to several cubic centimeters per analysis cycle.

Still further advantages arise from the sampling valves being in motion only for a short time duration during the programmed sampling thereof, thereby minimizing wear of the internal surfaces of the valve parts.

Yet further advantages are realized in this invention by the discrete sampling of fluids in addition to the fluid stream which eliminates the need for mixing the fluids when transferred into the vessel which is instrumented for measurement analysis.

Other advantages include fluid lubrication of the valve faces during operation thereby preventing formation of solids therein.

Still other advantages involve the saturation of purge gases with vapors of fluids to prevent deposition of solids at the gas/liquid interfaces in the valve body entryways thereby preventing clogging of the system.

Yet still further advantages include multiple mode programming so that several fluids may be added to the aliquot of the fluid stream in a multiple order of ways enhancing the accuracy of the analysis.

Other advantages of this invention are achieved in the use of the special discrete sampling technique utilizing small quantities of fluid streams and supplemental fluids which are combined and transferred into the instrumented measuring vessel at a rapid rate, and generally avoid all the disadvantages of continuous fluid stream sampling.

Brief summary

Briefly in accordance with this invention three fluid sampling valves that sample portions of a fluid stream, provide a flushing fluid and an electrolyte fluid, and transfer these portions between each other and into an instrumented vessel, in an ordered manner. The fluids to and from these sampling valves are controlled by means of solenoid actuators which may be programmed or manually switched. A supply of gas such as nitrogen is used to provide pressurization of the fluids and a compressed air tank is utilized to provide air to certain of the actuators in programmed order for activation thereof and consequently for actuation of the moving parts of the sampling valves. The instrumented vessel has metallic-ion sensitive probes, responsive to different chemicals of various charges which sample the ion concentrations present in the instrumented vessel and provide output to amplifiers which are connected to a multi-channel recorder. The amplifiers are adjusted or calibrated prior to use and are sequenced to provide output to the recorder channels in a given order so that the output of a particular probe set may be interpreted from the recordings in terms of element-ion concentrations present in the fluid stream.

EXEMPLARY EMBODIMENT

Structural relationships of the system

Figure 1:
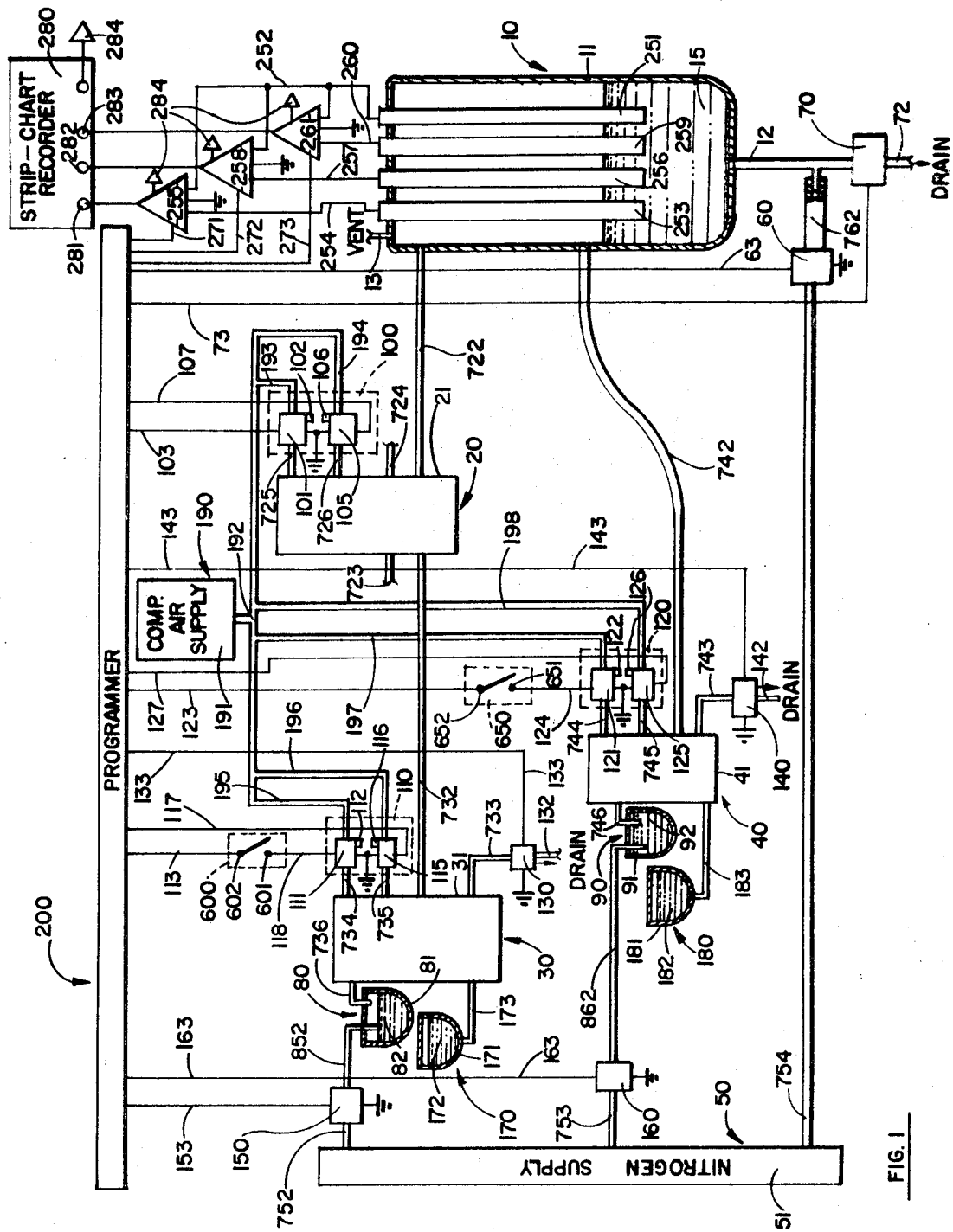
FIG. 1 is an electro-mechanical composite schematic of all the component parts of the system.

Referring to FIGS. 1, 3a, 4a, and 5a, a combination of a group of components forming a system for programmed fluid sampling and analysis includes an apparatus which is programmer controlled for sampling a fluid stream in order to subject the fluid stream to analysis. The system has the capability of transporting at least a portion of the fluid stream, a flushing fluid, and an electrolyte fluid. The system also contains a gas supply source for pressurization of these fluids.

First means for retaining samples of at least some of the above stated fluids is provided at 10. The first means is comprised of container vessel 11 having a narrowed portion 12 at the lower end thereof, said lowered portion being in a form of a T connector. Means 10 has at its upper end, vent 13 to provide a means for escaping of gas from within container 11. Means 10 also has adapted thereto element ion-responsive probes therein. In this embodiment, these probes are comprised of a common probe, a $Cu^{+2}$ ion-responsive probe, an $Fe^{+2}$ ion-responsive probe and an $Fe^{+3}$ ion-responsive probe. Voltages developed between the common probe $Cu^{+2}$, the $Fe^{+2}$, or the $Fe^{+3}$ probes will be utilized in conjunction with a group of amplifiers and a 3-channel strip chart recorder to measure and amplify the recorded measurements on the strip chart of the recorder. It is therefore assumed that in this embodiment that the hereinabove stated fluids within container 11 will constitute a mixture of such fluids designated as 15.

Second means 20 is connected to the first means for sampling an aliquot of the fluid stream and for transferring the aliquot from the second to the first means.

Third means 30 provides at least a portion of the flushing fluid to, and is connected to the second means for enabling transfer of the flushing fluid portion from the third means to the second means, thereby causing the flushing fluid to impel the aliquot into the first means which mixes with the flushing fluid.

Fourth means 40 is connected to an electrolyte fluid means and is also connected to the first means for providing at least a portion of the electrolyte fluid to the first means and for mixing a portion of the electrolyte fluid with the aliquot and with the flushing fluid portion within the first means so as to improve the accuracy of the analysis.

Fifth means 50 is adapted to the third means for providing gas 51 so as to move the flushing fluid through this apparatus under pressure, and is also adapted to the fourth means for providing gas 51, which may be nitrogen, so as to move the electrolyte fluid through this apparatus under pressure.

Sixth means 60 is a conventional solenoid actuated valve. Means 60 is connected by pipe 754 to the fifth means for providing nitrogen gas thereto. The sixth means has outlet 762 which is connected to the T portion of member 12. The sixth means is also electrically connected by means of wire 63 to the programmer. Hence, the sixth means is connected between the first and fifth means and the programmer for controlling flow of said gas to the first means, thereby mixing the fluids 15 within the first means and preventing gravitational drain of said fluids from said first means. The gas herein is also used to partially dissolve gases contained within the fluids in said first means.

Seventh means 70 is also a conventional solenoid actuated valve which is connected to the first means at the other opening of the T portion of member 12. The seventh means also has a drain pipe 72 for drainage of fluids contained within means 10 through means 70. The seventh means is also electrically connected to the programmer by means of wire 73. The seventh means is utilized to enable retention of the mixed fluids in the first means when the sixth means is activated by the programmer as well as for draining the mixed fluids from the first means when the seventh means is activated by the programmer.

Eighth means 80 is comprised of container 81 which contains a first fluid 82. Such first fluid may be deionized or distilled water. The eighth means is adapted to the third means by connecting pipe 736 extending into the eighth means and being fitted to pipe 402 which constitutes entryway 421 to the third means. Vapors consisting of gas 51 and portions of the first fluid enter through pipe 736 into entryway 421 of pipe 402. Crystalline solids normally tending to form in entryway 421 will thus be prevented from forming due to the flow of these vapors.

Ninth means 90 is comprised of container 91 which contains a second fluid 92. Such second fluid may be deionized or distilled water or some other applicable fluid. The ninth means is adapted to the fourth means by connecting pipe 746 fitted to pipe 502 which constitutes entryway 521 of the fourth means. Vapors consisting of gas 51 and portions of the second fluid enter pipe 746 and entryway 521 preventing blockage of entryway 521 by virtue of these vapors which would flow through this entryway.

Tenth means 100 is connected to the second means and to the programmer for controlling the flow of the fluid stream aliquot through the second means or for transferring the aliquot and flushing fluid which is impelled by gas 51 to the first means. The tenth means is comprised of solenoid actuated valves 101 and 105. Valve 101 is connected by means of pipe 725 to chamber 310 of second means 20. Valve 101 has relief vent 102 for allowing excessive compressed air to escape therefrom. Valve 101 is also electrically connected by means of wire 103 to the programmer. Valve 105 is connected by means of pipe 726 to chamber 311 of means 20. This valve has relief vent 106 to permit excessive air to escape therefrom. This valve is electrically connected by means of wire 107 to the programmer. The purposes of valves 101 and 105 are to respectively lower or raise diaphragm 320 within means 20 so as to respectively lower or raise movable member 316 which is connected to diaphragm 320 by means of connecting rod 313. When activated by the programmer, valves 101 and 105 permit compressed air to be passed therethrough into the respective chambers hereinabove recited.

Eleventh means 101 is connected to the third means and electrically connected to the programmer for controlling the flow of the flushing fluid which is impelled by gas 51 through the third means or for enabling dumping of said flushing fluid therefrom. The eleventh means is comprised of solenoid actuated valves 111 and 115. Valve 111 is connected by means of pipe 734 to chamber 410 within means 30. Valve 111 has relief vent 112 for allowing excessive compressed air to escape therefrom. Valve 111 is also electrically connected by means of wire 118 to stationary contact 601 of switch 600 and movable contact 602 of switch 600 is electrically connected by means of 113 to the programmer. The function of switch 600 will be hereinafter discussed in connection with the modes of operation of this system. Valve 115 is connected to chamber 411 of means 30 by pipe 735. This valve also has relief vent 116 for allowing excessive compressed air to escape therefrom. This valve is also electrically connected to the programmer by means of wire 117. The purpose of the functions of valves 111 and 115 is to respectively lower and raise diaphragm 420 which is connected by means of rod 413 to movable member 416, so as to respectively lower and raise said movable member. Valves 111 and 115 are activated by compressed air from a compressed air supply entering these valves upon actuation of valve 111 or 115.

Twelfth means 120 is connected to the fourth means and to the programmer for controlling the flow of electrolyte fluid impelled by gas 51 to the first means or for enabling dumping of the electrolyte fluid from the fourth means. The twelfth means is comprised of solenoid actuated valves 121 and 125. Valve 121 is connected by means of pipe 744 to chamber 510 of the fourth means. This valve also has relief vent 122 for allowing excessive compressed air to escape therefrom. Valve 121 is also electrically connected by means of wire 124 to stationary contact 651 of switch 650 and movable contact 652 of switch 650 is electrically connected by means of wire 123 to the programmer. Switch 650 will be hereinafter discussed in connection with the modes of operation of this system. Valve 125 is connected by means of pipe 745 to chamber 511 of means 40. This valve also has relief vent 126 for allowing excessive compressed air to escape therefrom. This valve is also electrically connected by means of wire 127 to the programmer. The purposes of valves 121 and 125 are for respectively lowering and raising diaphragm 520 of means 40. This diaphragm is connected by means of rod 513 to movable member 516 so that upon the lowering or the raising of the diaphragm the movable member correspondingly is lowered or raised. When activated by the programmer, valve 121 or 125 permit compressed air to be passed therethrough into the respective chambers hereinabove recited.

Thirteenth means 130 is connected to the third means by pipe 733 which attaches to pipe 140 extending from the third means. Drainage pipe 132 is adapted to the thirteenth means for providing a path for the drainage of the flushing fluid from the third means through the thirteenth means and out through pipe 132. This thirteenth means is a solenoid actuated device which is electrically connected by means of wire 133 to the programmer for controlling the drainage of the flushing fluid residual within the third means.

Fourteenth means 140 is connected to the fourth means by pipe 743 which attaches to pipe 510 extending from the fourth means. Drainage pipe 142 is adapted to the fourteenth means for providing path for the drainage of the electrolyte fluid from the fourth means through the fourteenth means and out through pipe 142. This fourteenth means is a solenoid actuated device which is electrically connected by means of wire 143 to the programmer for controlling the drainage of the electrolyte fluid residual within the fourth means.

Fifteenth means 150 is a solenoid actuated valve. This valve is connected by means of pipe 752 to means 50 for providing nitrogen gas 51 to valve 150. The output of valve 150 is connected to container 81 by means of pipe 852, one end of pipe 852 extending into fluid 82. Valve 150 is connected to the programmer by means of wire 153, so that when valve 150 is actuated, nitrogen gas 51 will flow into container 81 and mix with fluid 82 therein, providing the vapor required for injection into pipe 736.

Sixteenth means 160 is a solenoid actuated valve. This valve is connected by means of pipe 753 to means 50 for providing nitrogen gas 51 to valve 160. The output of valve 160 is connected to container 91 by means of pipe 862, one end of pipe 862 extending into fluid 92. Valve 160 is electrically connected to the programmer by means of wire 163, so that when valve 163 is actuated, nitrogen gas 51 will flow into container 91 and mix with fluid 92 therein, providing the vapors required for injection into pipe 746.

Seventeenth means 170 is comprised of container 171 which stores a supply of flushing fluid 172 therein. Container 171 has extension 173 attached thereto. Extension 173 is connected to pipe 409 which is affixed in an opening of body 401 of means 30. Flushing fluid 172 is generally 0.01th normal solution of sulfuric acid in water but may consist of other fluids as desired.

Eighteenth means 180 is comprised of container 181 which stores a supply of electrolyte fluid 182 therein. Container 181 is connected to extension 183. Extension 183 is connected to pipe 509 which is affixed in an opening of body 501 of means 40. Electrolyte fluid 182 is generally 0.1th normal solution of sodium pyrophosphate in water acidified to a pH of +8, but other solutions may be used as desired.

Nineteenth means 190 is comprised of storage tank 191 having a compressed air supply. Connecting pipe means 192 is attached to an opening in container 191 for distribution of compressed air therethrough. Pipe 192 is connected to pipes 193, 194, 195, 196, 197 and 198. Pipe 193 is connected to valve 101, pipe 194 is connected to valve 105, pipe 195 is connected to valve 111, pipe 196 is connected to valve 115, pipe 197 is connected to valve 121 and pipe 198 is connected to valve 125. These pipes connecting the compressed air supply to the valves hereinabove described, provide the compressed air required to actuate diaphragms 320, 420 and 520 thus enabling the sampling valves 20, 30 and 40 to assume the lowered and raised positions in accordance with the programmed operation of these sampling valves to be hereinafter described. Electrical power is provided from within the programmer and hence by the programmer to operate the several solenoid actuated valves as described hereinabove. Ground returns to the power source in the programmer are provided at valves 60, 70, 101, 105, 111, 115, 121, 125, 130, 140, 150, and 160. These grounds are shown in the various drawings as conventional ground symbols electrically connected to the several component parts hereinabove recited.

In the above connection of the several components of the system, it should be noted that container vessel 11 is connected by means of pipe 722 to pipe 323 which extends from an opening in body 301 through casing 21 of the second means 20. Pipe 723 is connected to pipe 302 which extends from an opening in body 301 and extends out of casing 21. Pipe 723 connects directly to the fluid stream input feed. Pipe 724 is connected to pipe 322 which extends from an opening in body 301 and out from casing 21. Pipe 724 connects directly to the fluid stream return feed.

Typical examples of the types of fluid streams that may be analyzed by this system are:

(1) etchant solution for preparing printed circuit boards, such as ferric chloride;

(2) electroless copper plating solution for depositing copper on printed circuit boards;

(3) solder plating bath for plating solder on prepared printed circuits;

(4) blood bank or directly coupled to human for sampling and analyzing characteristic of blood such as iron or iodine content;

(5) urine analysis directly coupled or otherwise connected to an apparatus for testing quantity of trace elements or metals;

(6) water polution study, obtaining results in terms of ion concentration of dissolved metals or other compounds such as trace copper, chromic ions which kill sea life; or (7) such other process streams as may be desired.

Pipe 732 is used for interconnecting at one end thereof with pipe 303 which extends from an opening in body 301 and extends through casing 21 of means 20. The other end of pipe 732 connects to pipe 408 which extends from an opening in body 401 and extends through casing 31 of means 30. Pipe 742 interconnects first means 10 and fourth means 40. At one end pipe 742 is connected to container vessel 11 of means 10 and at the other end pipe 742 is connected to pipe 508 which extends from an opening in body 501 through casing 41 of means 40.

Structural relationships of the programmer

Referring to FIGS. 2, 6a, 6b and 6c, an exemplary programmer for use in the above described system is schematically shown at 200.

The programmer is comprised of seven bands of 360° switch wafers, shown laid out linearly in the schematic for ease of understanding. Each has a rotatable contactor and a series of stationary contacts with which the rotatable contactor makes contact when the rotatable contactors are driven.

Figure 6A:
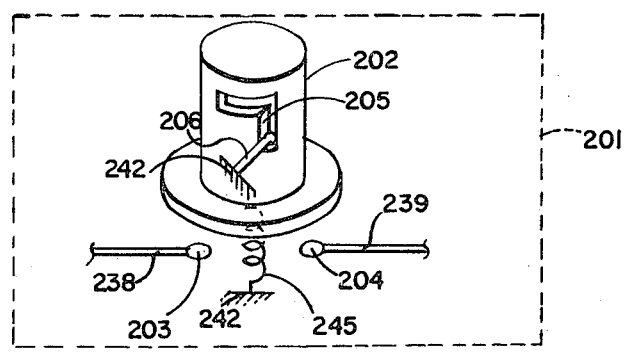
FIG. 6a is a perspective view of the programmer initiating and recycling push button showing the push button in the unoperated mode.
Figure 6B:
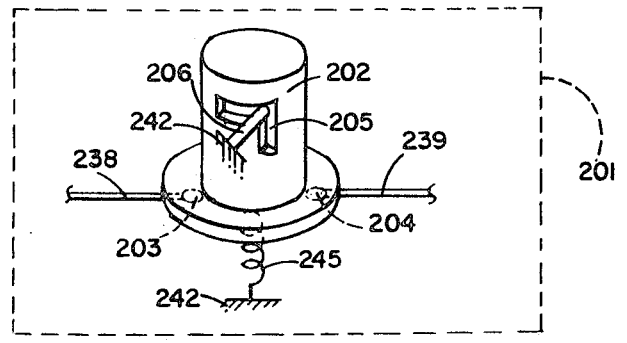
FIG. 6b is the same push button as in FIG. 6a in a depressed mode for providing a single cycle programmed operation of the system.

The programmer also includes control means and power means for activating the wafers and for supplying periodic power to the several stationary contactors in accordance with a predetermined programmed period of time, generally a function of the length of the stationary contactors and the drive rate of the movable contactors. Push button 201 is provided with movable contactor 202 and stationary contactors 203 and 204. Movable contactor 202 has a generally right angle slot 205 therein for permitting member 206, fixed at one end at 242, to ride therein and following the contour of the slot when member 202 is manually actuated. It follows that when momentary contact between contactors 202, 203 and 204 are desired, contactor 202 nearly has to be pushed downward in the direction indicated by the arrow in FIG. 6b. In this instance, member 206 will ride from the bottom to the top of the vertical portion of slot 205. When it is desired to maintain contact between contactors 202, 203 and 204, an indefinite period of time, without human intervention, then member 202 will be twisted in a direction indicated by the arrow in FIG. 6c, thereby additionally causing member 206 to follow the horizontal portion of slot 205 and will be held by said horizontal portion in position until member 202 is untwisted in a direction opposite to the arrow shown in FIG. 6c. When untwisted, the horizontal portion of slot 205 will be positioned in such a manner so that member 206 rides within the vertical portion of slot 205, the motion of member 202 being in an upward direction opposite to that shown by the arrow in FIG. 6b, thereby restoring switch 201 to its normal unoperated position as shown in FIG. 6a. Tension spring 245 fixed at one end at 246 and connected at the other end to member 202 is used to restore member 202 to its normally inoperative position when member 202 is either manually released or is untwisted in a direction opposite to the arrow shown in FIG. 6c.

Contact 203 is electrically connected by means of wire 238 to movable contactor 208 of micro-switch 207. Contact 204 is electrically connected by means of wire 239 to stationary contactor 209 of micro-switch 207. Micro-switch 207 is normally in open mode position. Contactors 208 and 209 do not cooperate in the normal open mode position. Contactor 208 has at its free end, follower 210 which cooperates with cam 211. In the normal inoperative mode, follower 210 is in cooperation with the high portion of cam 211. During the time that the programmer is operative, follower 210 is generally in the cooperative relationship with the low portion of cam 211. Cam 211 is affixed to shaft 212. Shaft 212 is coupled to motor 213 and to all the movable contactors of the switch wafers to be described hereinbelow. Power to activate the programmer and the system is provided by battery 214. Ground return symbol is shown connected to the negative end of battery 214 for providing the return path to all components as well as to the programmer, and the positive of terminal of battery 214 is electrically connected by means of wire 240 to contactor 208. One side of motor 213 is electrically connected by means of wire 241 to contactor 209, the other side of this motor being electrically connected to group or power return indicated by the ground symbol.

Movable contactor 215 of the first switch wafer, movable contactor 219 of the second switch wafer, movable contactor 223 of the third switch wafer, movable contactor 226 of the fourth switch wafer, movable contactor 228 of the fifth switch wafer, movable contactor 231 of the sixth switch wafer and movable contactor 234 of the seventh switch wafer are all ganged and connected to shaft 212. This enables the several movable contactors to be rotated simultaneously when driven by motor 213. Movable contactors 215, 219, 223, 226, 228, 231 and 234 are all electrically connected to each other and to contactor 209 by means of cable 237. These connections will enable power to be distributed by these movable contactors to their respective stationary contactors in the operational modes of the sequencer when member 202 is manually momentarily depressed and/or twisted so as to provide cooperation of member 202 with contactors 203 and 204.

Motor 213 is a fast self-braking type motor having a shaft rotational speed of 120 seconds per one revolution of 360°. Therefore, one 360° rotation of cam 211 will constitute the 120 seconds of timed duration of a single cycle of this system.

Contactors 216, 217, 218 comprise all the stationary contactors in the first wafer bank. Wire 133 is electrically connected to contactor 216, wire 153 is electrically connected to contactor 217, and wire 107 is electrically connected to contactor 218. Contactor 216 extends between 60 and 120° of the wafer circle corresponding to a timed period between 20 and 40 seconds. Contactor 217 extends between 150 and 210 degrees on the wafer circle corresponding to a timed period between 50 and 70 seconds. Contactor 218 extends between 300 and 330 degrees on the wafer circle corresponding to a timed period between 100 and 110 seconds.

Contactors 220, 221, 222 comprise all the stationary contactors of the second wafer. Wire 113 is electrically connected to contactor 220. Contactor 221 is electrically connected to wire 143 and contactor 222 is electrically connected to wire 163. Contactor 220 extends between zero and 30 degrees on the wafer circle corresponding to a timed period between zero (iniation of cycle) and ten seconds. Contactor 221 extends between 60 and 120 degrees on the wafer circle corresponding to a timed period between 20 and 40 seconds. Contactor 222 extends between 150 and 210 degrees of the wafer circle corresponding to a timed period between 50 and 70 seconds.

Contactors 224 and 225 comprise all the stationary contactors of the third wafer bank. Contactor 224 is electrically connected to wire 123. Contactor 225 is electrically connected to wire 73. Contact 224 extends between zero and 30 degrees on the wafer circle corresponding to a timed period between zero and ten seconds. Contactor 225 extends between 90 and 120 degrees on a wafer circle corresponding to a timed period between 30 and 40 seconds.

Contactor 227 comprises the stationary contactor of the fourth wafer bank. Contactor 227 is electrically connected to wire 63. Contactor 227 extends between 120 and 210 degrees on the wafer circle corresponding to a timed period between 40 and 70 seconds.

Contactors 229 and 230 comprise all the stationary contactors of the fifth wafer bank. Contactor 229 is electrically connected to wire 117. Contactors 230 is electrically connected to wire 271. Contactor 229 extends between 120 and 150 degrees on the wafer circle corresponding to a timed period between 40 and 50 seconds. Contactor 230 extends between 210 and 240 degrees on the wafer circle corresponding to a timed period between 70 and 80 seconds.

Contactors 232 and 233 comprise all the stationary contactors of the sixth wafer bank. Contactor 232 is electrically connected to wire 103. Contactor 233 is electrically connected to wire 272. Contactor 232 extends between 120 and 150 degrees on the wafer circle corresponding to a timed period between 40 to 50 seconds. Contactor 233 extends between 240 and 270 degrees on the wafer circle corresponding to a timed period between 80 to 90 seconds.

Contactors 235 and 236 comprise all the stationary contactors of the 7th wafer bang. Contactor 235 is electrically connected to wire 127. Contactor 236 is electrically connected to wire 273. Contactor 235 extends between 120 and 150 degrees on the wafer circle corresponding to a timed period between 40 to 50 seconds. Contactor 236 extends between 270 and 300 degrees on the wafer circle corresponding to a timed period between 90 to 100 seconds.

It is seen from above that the last activity occurred is movable contactor 215 which cooperates with stationary contactor 218 at 330 degrees of the wafer circle which corresponds to 110 seconds of elapsed time from initial activation of the programmer. A 30 degree span on the wafer circle corresponding to a ten second lapse of time is provided from the last contact between contacts 215 and 218 and initiation position of a single programmed cycle of the system. This ten second or 30 degree lapse is provided between 330 and zero (360) degrees, corresponding to 110 and 120 seconds of elapsed time.

When contactor 202 is momentarily manually depressed, the programmer will be caused to execute a single and complete cycle, thereby causing execution of a complete cycle of the system in accordance with any of the three modes of operations to be described hereinbelow.

Figure 6C:
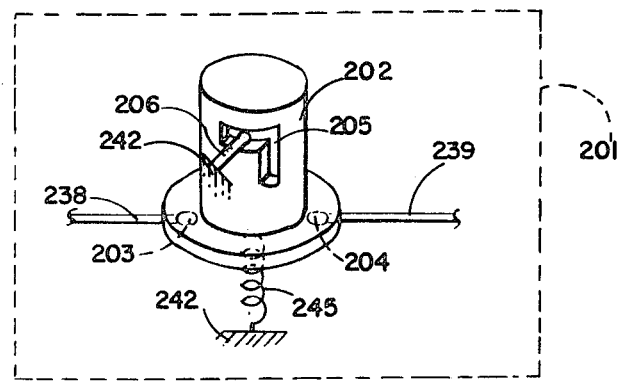
FIG. 6c is the same push button as in FIG. 6a in a depressed and locked mode for providing multiple cycle programmed operation of the system.

When contactor 202 is first manually depressed, followed by twisting of member 202, in accordance with the directional arrow in FIG. 6c, the programmer will remain operative indefinitely repeating any number of complete cycles of the system until member 202 is manually untwisted in a direction opposite to the arrow shown in FIG. 6c, thereby causing member 202 to be restored in the position shown in FIG. 6a so that member 202 will no longer cooperate with contactors 203 and 204, thereby causing motor 213 to be disconnected from its power means 214 at a point when cam 211 had been rotated to a position so that the high portion thereof again causes contactors 208 and 209 to cease cooperating with each other thus removing power from the motor. It is evident that in this programmer, once push button 201 is manually momentarily operated or is held operational by the means described above, and the push button is released to its normal inoperative position as in FIG. 6a, it will only be possible for the programmer to stop at either one complete cycle or at the end of the integral number of cycles, as the case may be.

Structural relationship of the system instrumentation

Figure 2:
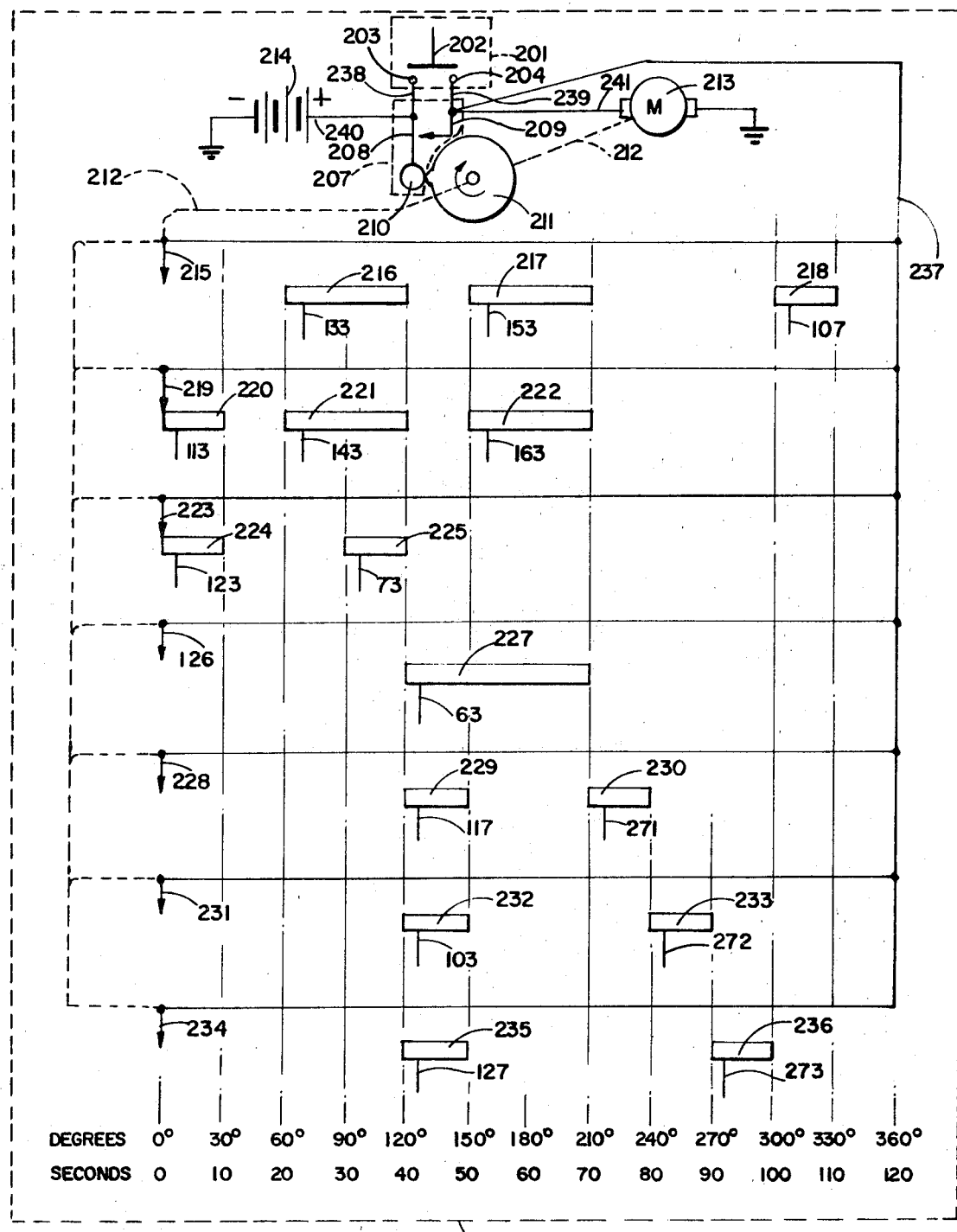
FIG. 2 is a schematic of an exemplary programmer that may be used in connection with this system.

Referring to FIGS. 1 and 2. The system is instrumented by means of commercially available probes, amplifiers, a strip-chart recorder, and programmer 200 as hereinabove described.

The probes which are adapted to container vessel 11 so as to immerse at least a portion thereof in fluids 15. The probes comprise common probe 251, $Cu^{+2}$ ion probe 253, $Fe^{+2}$ ion probe 256 and $Fe^{+3}$ ion probe 259. Probe 251 acts as a common probe for obtaining voltages between that probe and any of the probes 253, 256, or 259. The output of probe 251 is electrically connected by means of wire 252 to probe signal common input terminals of amplifiers 255, 258 and 261. The output terminal of probe 253 is electrically connected by means of wire 254 to the other input terminal of amplifier 255. The output of probe 256 is electrically connected by means of wire 257 to the other input terminal of amplifier 258. The output terminal of probe 259 is electrically connected by means of wire 260 to the other input terminal of amplifier 261. The output of amplifier 255 is connected to the input of channel 281 of strip-chart recorder 280. The output of amplifier 258 is electrically connected to the input of channel 282 of recorder 280. The output of amplifier 261 is electrically connected to input channel 283 of strip-chart recorder 280. The signal return of strip-chart recorder and signal returns of the output of amplifiers 255, 258, and 261 are shown symbolically as return symbol 284. The conventional ground symbol is provided at amplifiers to 255, 258 and 261 to indicate power return to negative terminal of battery 214.

The amplifiers are sequentially energized by the programmer in accordance with the periods of operations assigned thereto which are hereinafter stated in tables governing modes 1, 2, or 3 of the system. In order to energize amplifier 255, power is provided by programmer 200 by virtue of interconnection of that amplifier by means of wire 271 to the programmer. Likewise, to energize amplifier 258, power is provided thereto through the programmer by interconnection of this amplifier to the programmer by means of wire 272. Similarly, to energize amplifier 261, power is provided thereto through the programmer by interconnection of this amplifier to the programmer by means of wire 273.

The following constitutes a table of ion concentration levels versus signal outputs between any of the three probes and the signal return probe 251:

| Ion concentration in moles/liter | Probe output voltages in millivolts | | |
| --- | --- | --- | --- |
| | $Cu^{+2}$, probe 253 | $Fe^{+2}$, probe 256 | $Fe^{+3}$, probe 259 |
| $10^{-1}$ | +60 | +60 | +40 |
| $10^{-2}$ | +30 | +30 | +20 |
| $10^{-3}$ | 0 | 0 | 0 |
| $10^{-4}$ | −30 | −30 | −20 |
| $10^{-5}$ | −60 | −60 | −40 |

An example of cupric probe 253 (the probe used to sense $Cu^{+2}$ ion concentration) is that manufactured by Orion Research Inc., 11 Blackstone Street, Cambridge, Mass., as Model No. 94–29 in their catalog number CAT./8612, copyright 1968.

An example of common probe 251 (the probe that is used in combination with either the $Cu^{+2}$, $Fe^{+2}$, of $Fe^{+3}$ probes) to feed a voltage from the solution of the first means to the amplifiers is also given in the same Orion catalog as Model Number 90–01.

The system is calibrated by the following procedure:

(1) Container vessel 11 is filled so as to immerse the lower portions of the probes in a solution of known ion concentration, say for example a solution having an ion concentration of $Cu^{+2}=10^{-3}$ moles/liter. This will provide a zero voltage output between probes 253–251.

(2) The amplifiers 255, 258 and 261 are each sequentially connected to probes 253, 256 or 259 in combination with probe 251, and are balanced by a balance adjustment thereon so that their outputs will read zero. The amplifiers used are basically balanced-type DC amplifiers so that both positive and negative readings will be obtainable therefrom.

(3) Each of the amplifiers will then be connected to their respective recorder channels and discrete settings such as amplification levels of 1, 10, 100, 1000, etc. are selected to provide convenient reading capability of the recorder stripchart. The recorder pen positioner adjustment will generally be used to set the recorder pen at center of the paper provided for each channel so that excursions in positive and negative directions may be recorded and read.

(4) The known fluid will then be drained from vessel 11, vessel 11 will be purged with nitrogen, and the amplifiers, probes, and recorder channels connected to the system in accordance with FIG. 1. The system is now calibrated for use with fluid streams containing some or any of $Cu^{+2}$, $Fe^{+2}$ or $Fe^{+3}$ ions.

Therefore, it follows from the above that the system embodies an analysis means including a plurality of sensors and a common sensor which are adapted to the fluids within the first means. Each of the plurality of sensors and the common sensor in combination being responsive to a corresponding plurality of ionic elements for providing a measure of quantitative element ion concentration outputs therefrom.

Structural relationships of process stream sampling valve

Figure 3A:
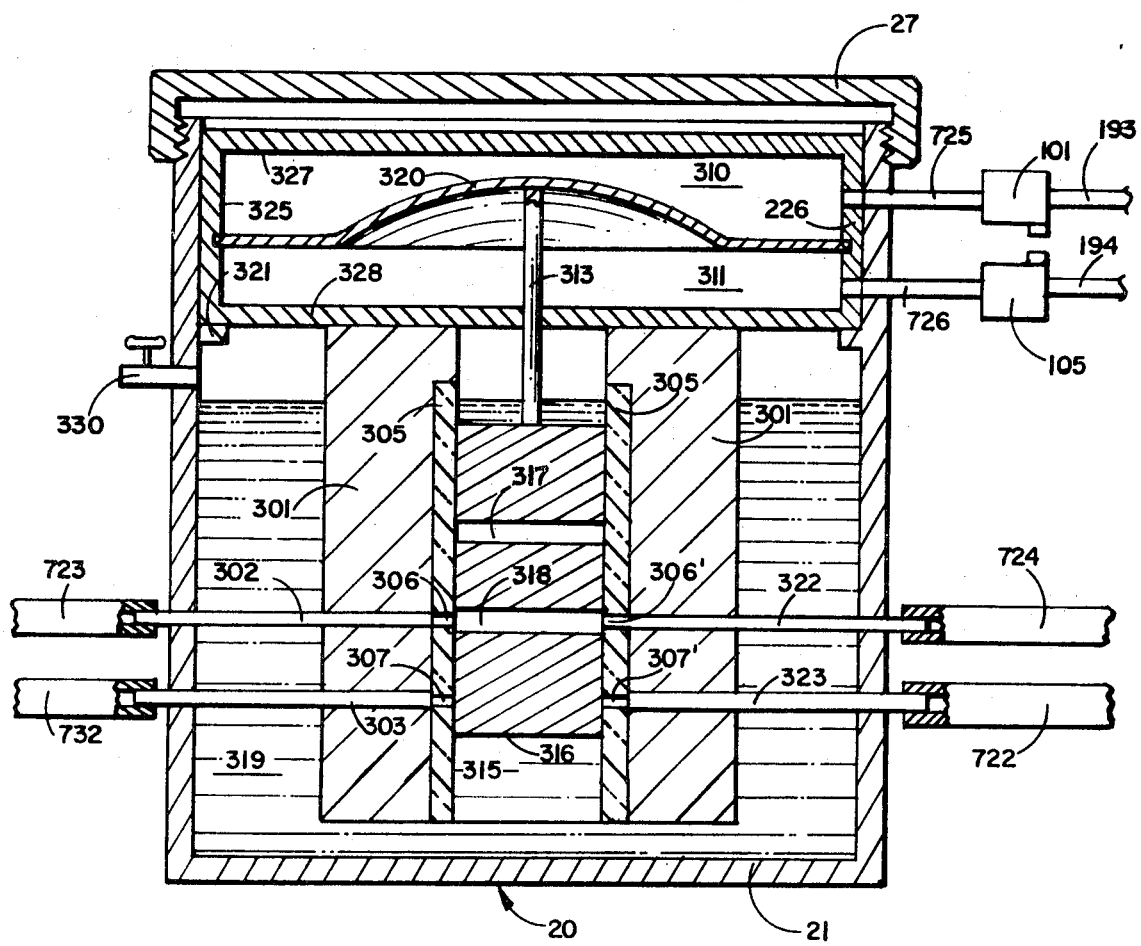
FIG. 3a is a detailed view partially in cross-section and partially in elevation of the fluid stream sampling valve (the second means) showing the movable member thereof in a raised position.
Figure 3B:
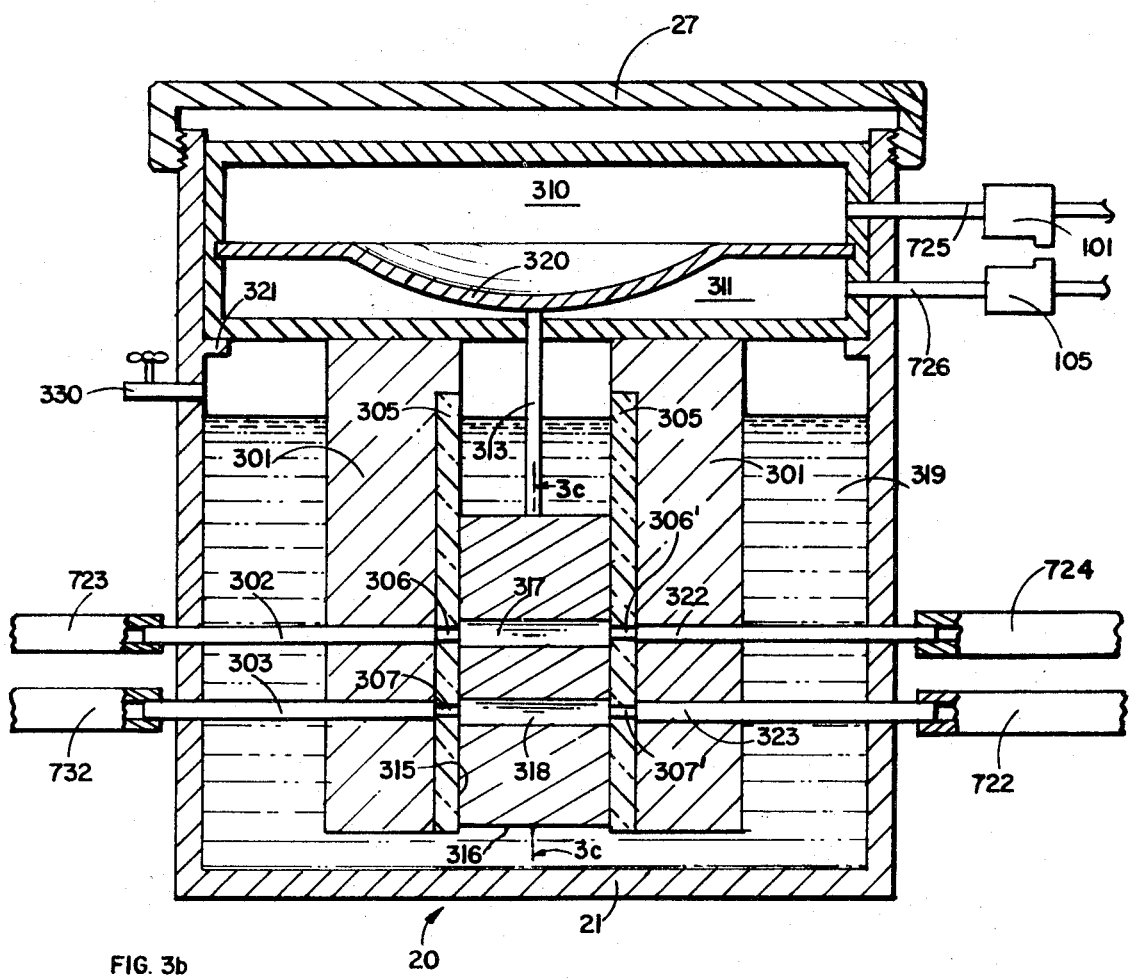
FIG. 3b is a detailed view partially in cross-section and partially in elevation of the fluid stream sampling valve showing the movable member thereof in a lowered position.
Figure 3C:
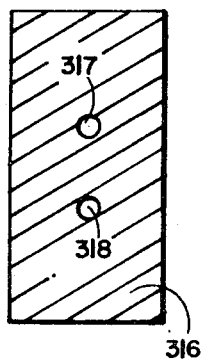
FIG. 3c is a view taken along plane 3c—3c of FIG. 3b showing a detailed cross-section view of the movable member of the fluid stream sampling valve.

Referring to FIGS. 3a, 3b and 3c, the process stream sampling valve is provided at 20. Casing 21 is a leak proof enclosure in which the parts of this valve are installed. Threaded cover 27 is provided to engage with external threads of casing 21 so as to seal off this valve when ready for use. As herinabove stated, external pipes 722, 723, 724, 725, 726 and 732 are connected to this valve. Valve body 301 generally made of high polished steel, although other materials may be used, has transverse openings therein in which pipes 302, 322, 303, and 323 are inserted. These pipes extend out of casing 21 and are used for interconnection with the external pipes of the system as hereinabove described. Body 301 is provided with a glass or similar type inner lining 305. Lining 305 is generally of the rectangular or square configuration. Inner lining 305 has opening 306 which is aligned with opening of pipe 302. Opening 306' is aligned with opening of pipe 322. Opening 307' is aligned with opening of pipe 303. Opening 307' is aligned with opening of pipe 323. Member 328 having an aperture through its center is attached to body 301. A compartment is formed by attaching members 325 and 326, which are semicircular members, the compartment being formed in combination with members 327 and 328, which are circular planar members. Within this compartment, diaphragm 320 is attached to members 325 and 326, thereby forming chambers 310 and 311 which have respectively connected thereto pipe 725 and 726 as hereinabove stated. Diaphragm 320 is attached by means of rod 313 extending through the aperture in member 328 and connecting to movable rectangular shaped Teflon member 316. Member 316 moves within aperture 315 lined with inner lining 305, the slidable surfaces of the inner lining 305 and the movable member 316 cooperating with each other, to enable motion of the movable member with minimal friction. Member 316 has apertures 317 and 318 at right angles to its axis of motion. When diaphragm 320 is in a raised position, member 316 will be in a raised position and communication between pipe 302, apertures 306, 318, 306', and pipe 322 will be provided. When the diaphragm is in a lowered position, movable member 316 will therefore be in a lowered position and communication will be established between pipe 302, aperture 306, aperture 317, aperture 306', and pipe 322, as well as communication will be established between pipe 303, aperture 307, aperture 318, aperture 307' and pipe 323.

In preparing means 20 ready for usage, the component assembly internal to casing 21 is slid into casing 21 as one unit. Pipes 302, 303 322, 323 are snap-slid through seal-tight openings of casing 21, and member 328 is seated on a flange 321. Pipe 725 is inserted through the casing so that it communicates with chamber 310 and pipe 726 is inserted through the casing so that it communicates with chamber 311. Valve 330 is opened and the inside of casing 21 is filled with water 319, entering through this valve approximately to just below the level of valve 330. Thereafter, valve 330 is shut and cover 27 is threaded on to casing 21, thereby sealing fluid stream sampling valve 20.

Therefore, it may be stated that the second means will generally be comprised of a body having a plurality of openings therein; a movable member within an aperture in the body, said movable member having openings therein corresponding to openings in the body and an activating member coupled to the movable member for moving the movable member so as to enable flushing fluid to be passed through the second means when the activating member is in a lowered position or to inhibit the flow of the flushing fluid through the second means when the activating member is in a raised position. It may also be stated that the second means may have an additional or other fluid other than fluid 319 therein enveloping at least portions of the moving parts for lubrication and ease of operation thereof.

Structural relationships of flushing fluid sampling valve

Figure 4A:
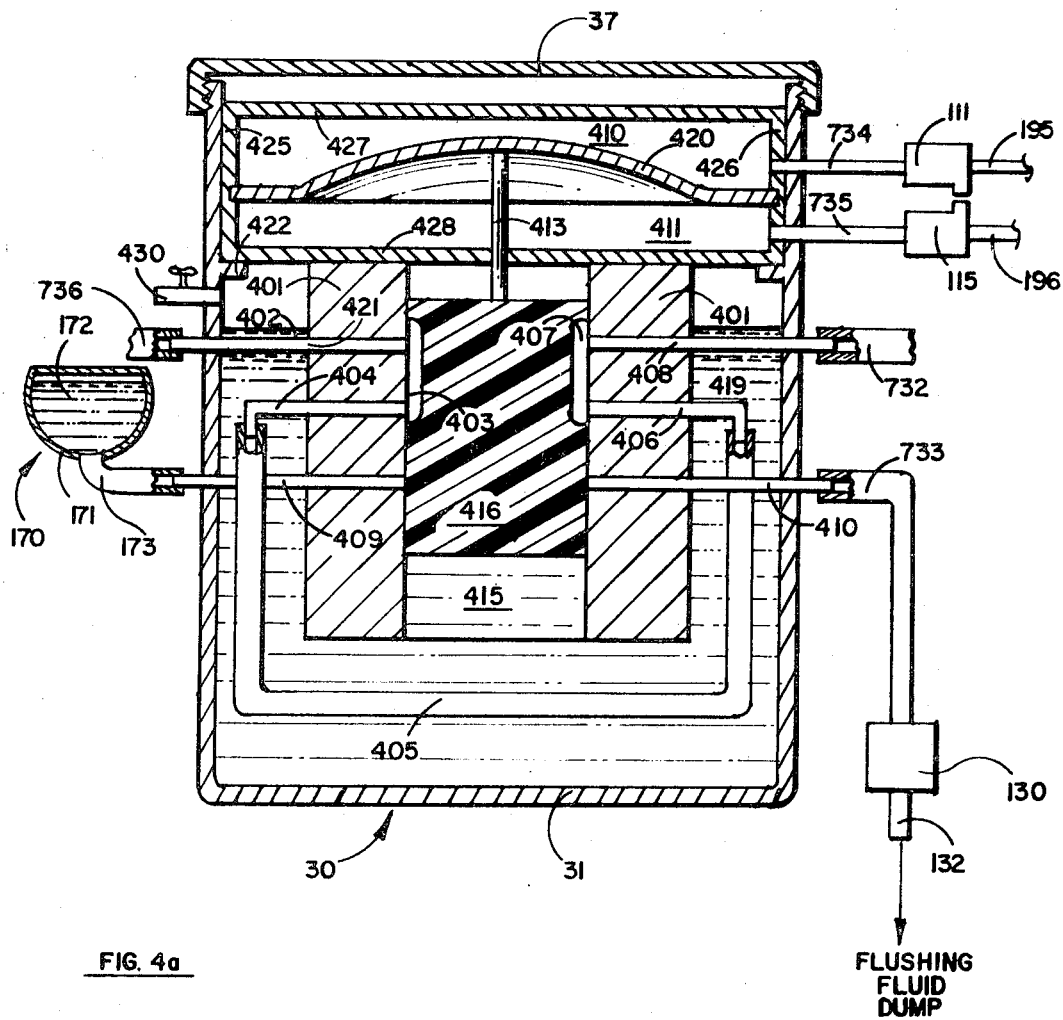
FIG. 4a is a detailed view partially in cross-section and partially in elevation of the flushing fluid sampling valve (third means) showing the movable member thereof in a raised position.
Figure 4B:
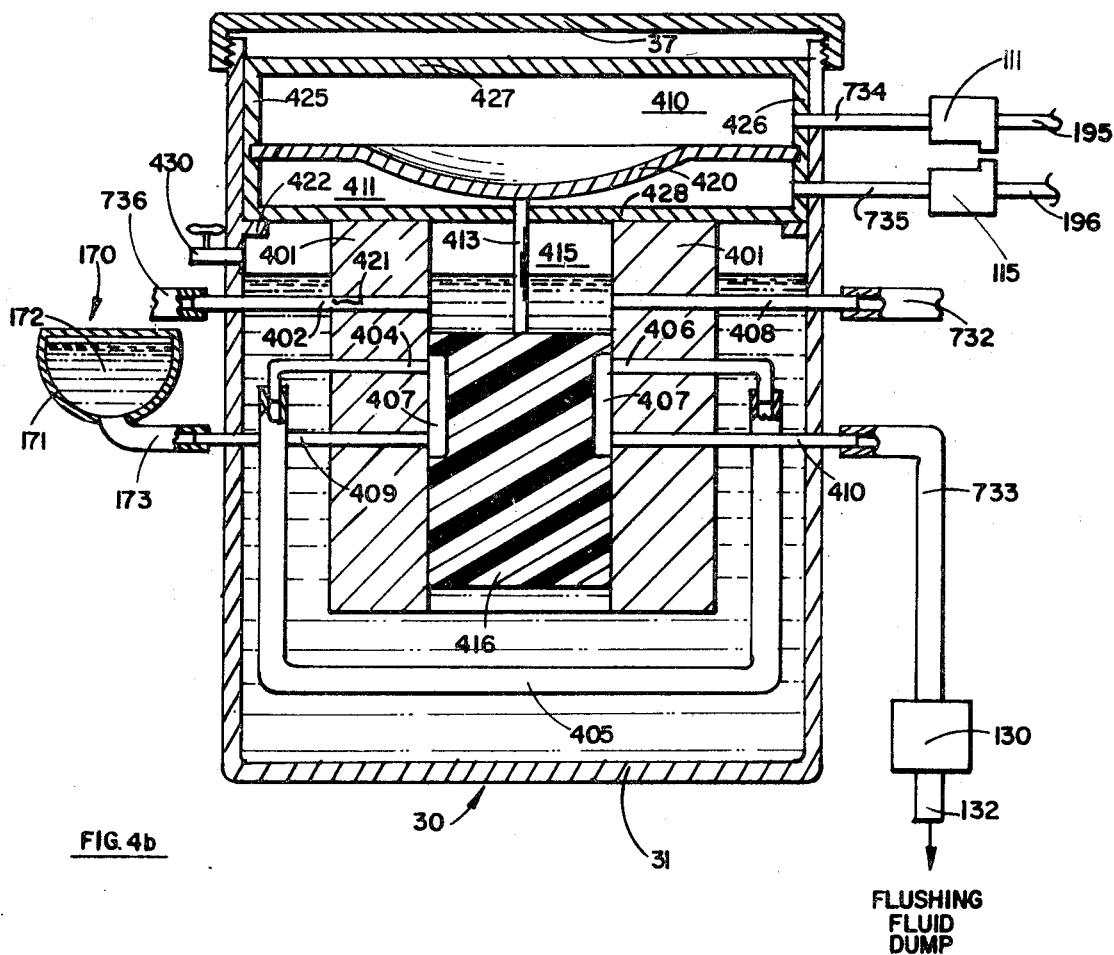
FIG. 4b is a detailed view partially in cross-section and partially in elevation of the flushing fluid sampling valve showing the movable member thereof in a lowered position.
Figure 4C:
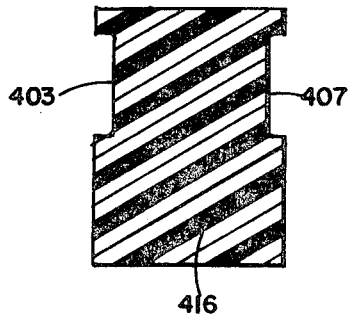
FIG. 4c is a view taken along plane 4c—4c of FIG. 4b showing a detailed cross-section view of the movable member of the flushing fluid sampling valve.

Referring to FIGS. 4a, 4b and 4c, the flushing fluid valve is provided at 30. Casing 31 is a leak proof enclosure in which the parts of this valve are installed. Threaded cover 37 is provided to engage with external threads of casing 31 so as to seal off this valve when ready for use. As hereinabove stated, external pipes 732, 733, 736 and extension member 173 are connected to this valve. Body 401 is generally made of steel having a rectangular shaped aperture 416 along its axial length at its center. This body also has openings in a direction transverse its axial length for insertion therein of pipes 402, 404, 406 and 408. One end of pipe 404 is connected to one end of looped pipe 405, while the other end of looped pipe 405 is connected to one end of pipe 406. Pipes 404, 405 and 406 are completely within the confines of casing 31. An end of pipe 402 extends through casing 31 and attaches to pipe 736 as hereinabove described. An end of pipe 408 extends outward through casing 31 and attaches to pipe 732, as hereinabove described. One end of pipe 409 extends into one of the openings in body 401 in a direction transverse the axial length of this body, the other end thereof extending outward through casing 31. This other end is attached to extension 173, as hereinabove described. One end of pipe 410 extends into one of the transverse openings in body 401, the other end thereof extending outward from casing 31 and attaching to pipe 733, as hereinabove described. Member 428 having an aperture through its center is attached to body 401. A compartment is formed by attaching members 425 and 426, which are semi-circular members, formed in an arched shape, to members 427 and 428, which are circular planar members. Within this compartment, diaphragm 420 is attached to members 425 and 426, thereby forming chambers 410 and 411 which have respectively connected thereto pipes 734 and 735 as hereinabove stated. Diaphragm 420 is attached by means of rod 413 extending through the aperture in member 428 and connecting to movable rectangular shaped Teflon member 416. Member 416 moves within aperture 415 cooperating with the inner surfaces of body 401. Since member 416 is made of Teflon, that member will move within aperture 415 with minimal friction resulting from cooperation of said Teflon surfaces with the inner polished surfaces of body 401. Member 416 has two individual apertures 403 and 407, parallel to the longitudinal axis of member 416. When diaphragm 420 is in a raised position, member 416 will be in a raised position and communication will result between pipe 402, aperture 403, and pipe 404. Communication will also result between pipe 406, aperture 407, and pipe 408, thereby providing communication through loop 405, and complete communication between pipes 736 and 732. When diaphragm 420 is in a lowered position, movable member 416 will, therefore be in a lowered position and communication will be established between means 170 by connection of extension 173 to pipe 409, through aperture 403, through pipe 404, through looped pipe 405, through pipe 406, through aperture 407, through pipe 410 and out through pipe 733, to establish communication with means 130.

In preparing means 30 ready for usage, the component assembly internal to casing 31, is slid into casing 31 as one unit. Pipes 402, 408, 409 and 410 are snap-slid through seal-tight openings of casing 31, and member 428 is seated on flange 422. Pipe 734 is inserted through the casing and into chamber 410, and pipe 735 is inserted through the casing and into chamber 411. Valve 430 is opened and the inside of casing 31 is filled with water 419 entering through this valve approximately to just below the level of valve 430. Thereafter, valve 430 is shut and cover 37 is threaded onto casing 31, thereby sealing flushing fluid sampling valve 30.

Therefore, it may be stated that the third means will generally be comprised of a body having a plurality of openings therein; a movable member within an aperture in the body, said movable member having openings therein corresponding to the openings in the body and an activating member coupled to the movable member for moving the movable member so as to enable the flushing fluid and a gas to be passed through the third means when the activating member is in a raised position or for directing the flow of the flushing fluid for draining thereof from the third means when the activating member is in a lowered position. It may also be stated that the third means may have an additional or other fluid, other than fluid 419, therein enveloping at least portions of the moving parts for lubrication and ease of operation thereof.

Structural relationships of electrolyte fluid sampling valve

Figure 5A:
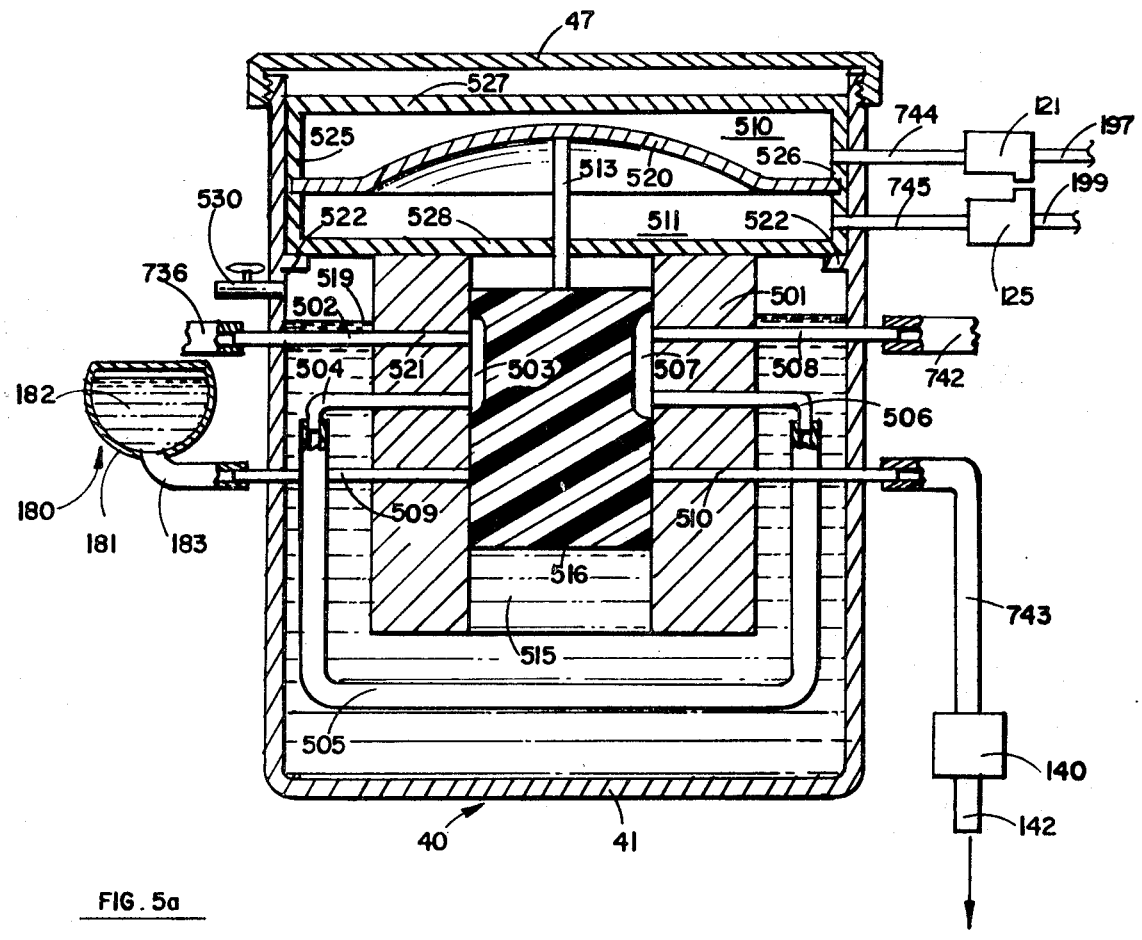
FIG. 5a is a detailed view partially in cross-section and partially in elevation of the electrolyte fluid sampling valve (fourth means) showing the movable member thereof in a raised position.
Figure 5B:
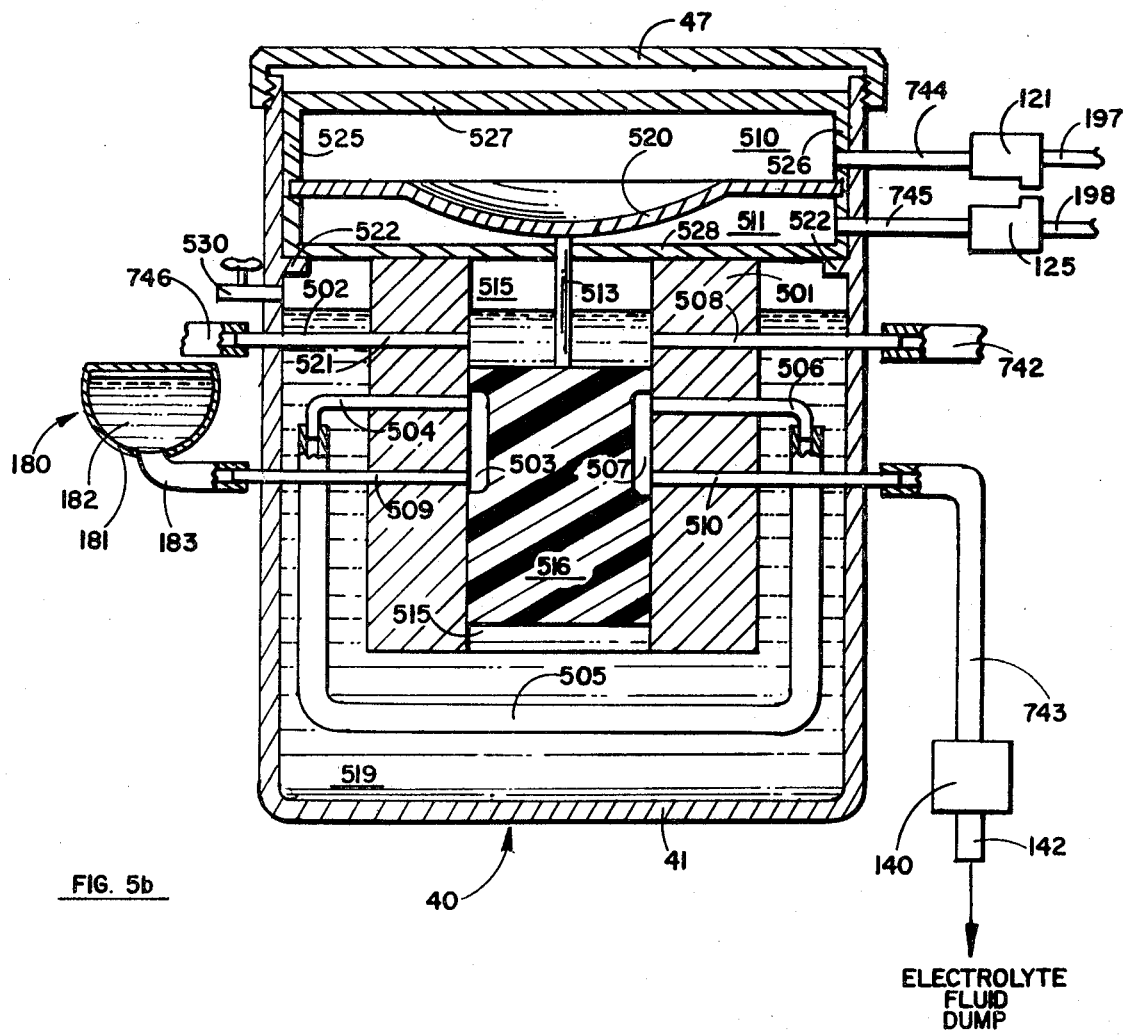
FIG. 5b is a detailed view partially in cross-section and partially in elevation of the electrolyte fluid sampling valve showing the movable member thereof in a lowered position.
Figure 5C:
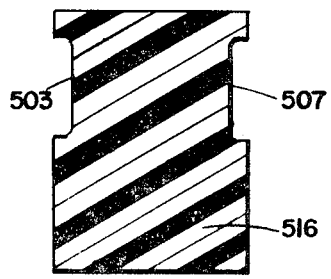
FIG. 5c is a view taken along plane 5c—5c of FIG. 5b showing a detailed cross-section view of the movable member of the electrolyte fluid sampling valve.

Referring to FIGS. 5a, 5b, and 5c, the electrolyte fluid sampling valve is provided at 40. Casing 41 is a leak proof enclosure in which the parts of this valve are installed. Threaded cover 47 is provided to engage with external thrads of casing 41 so as to seal off this valve when ready for use. As hereinabove stated, external pipes 742, 743, 746 and extension member 183 are connected to this valve. Body 501 is generally made of steel having a rectangular shaped aperture 516 along its axial length at its center. This body also has openings in a direction transverse its axial length for insertion therein of pipes 502, 504, 506 and 508. One end of pipe 504 is connected to one end of looped pipe 505, while the other end of looped pipe 505 is connected to one end of pipe 506. Pipe 504, 505 and 506 are completely within the confines of casing 41. An end of pipe 502 extends outward through casing 41 and attaches to pipe 746, as hereinabove described. An end of pipe 508 extends outward through casing 41 and attaches to pipe 742, as hereinabove described.

One end of pipe 509 extends into one of the openings in body 501 in a direction transverse the axial length of this body, the other end thereof extending outward through casing 41. This other end is attached to extension 183, as hereinabove described. One end of pipe 510 extends into one of the transverse openings in body 501, the other end thereof extending outward from casing 41 and attaching to pipe 743 as hereinabove described. Member 528 having an aperture through its center is attached to body 501. A compartment is formed by attaching members 525 and 526, which are semi-circular members formed in an arched shape, to members 527 and 528, which are circular planar members. Within this compartment, diaphragm 520 is attached to members 525 and 526, thereby forming chambers 510 and 511 which have respectively connected thereto pipes 744 and 745, as hereinabove stated. Diaphragm 520 is attached by means of rod 513 extending through the aperture in member 528 and connecting to movable rectangular shaped Teflon member 516. Member 516 moves within aperture 515 cooperating with the inner surfaces of body 501. Since member 516 is made of Teflon, that member will move within aperture 515 with minimal friction resulting from cooperation of said Teflon surfaces with the inner polished surfaces of body 501. Member 516 has two individual apertures 503 and 507 parallel to the longitudinal axis of member 516. When diaphragm 520 is in a raised position, member 516 will be in a raised position and communication will result between pipe 502, aperture 503, and pipe 504. Communication will also result between pipe 506, aperture 507 and pipe 508, thereby providing communication through looped pipe 505, and complete communication between pipe 746 and 742. When diaphragm 520 is in a lowered position, movable member 516 will therefore be in a lowered position, movable member 516 will therefore be in a lowered position, and communication will be established between means 180 by connection of extension 183 to pipe 590, through aperture 503, through pipe 504, through looped pipe 505, through pipe 506, through aperture 507, through pipe 510 and out through pipe 743, to establish communication with means 140.

In preparing means 40 ready for usage, the component assembly internal of casing 41, is slid into casing 41 as one unit. Pipes 502, 508, 509 and 510 are snap-slid through seal-tight openings of casing 41, and member 528 is seated on flange 522. Pipe 744 is inserted through the casing and into chamber 510 and pipe 745 is inserted through the casing and into chamber 511. Valve 530 is opened and the inside of casing 41 is filled with water 519, entering through this valve, approximately to just below the level of valve 530. Thereafter, valve 530 is shut and cover 47 is threaded onto casing 41, thereby sealing electrolyte fluid sampling valve 40.

Therefore, it may be stated, that the fourth means will generally be comprised of a body having a plurality of openings therein; movable member within an aperture in the body, said movable member having openings therein corresponding to the openings in the body and an activating member coupled to a movable member for moving the movable member so as to enable the electrolyte fluid and gas to be passed through the fourth means when the activating member is in a raised position, or for directing the flow of the electrolyte fluid for draining thereof from the fourth means when the activating member is in a lowered position. It may also be stated that the fourth means may have an additional or other fluid, other than fluid 419 therein, enveloping at least portions of the moving parts for lubrication and ease of operation thereof.

Operational relationships within the programmer

Referring to FIGS. 1 and 2 and occasionally to the other remaining figures, when the programmer 200 is activated by momentarily depressing push button 201, movable contactor 219 cooperating with and applying power to stationary contactor 220 and hence to wire 113, activates valve 111 when switch 600 is closed and provides power thereto and compressed air into chamber 410 for lowering diaphragm 420, excessive compressed air escaping through relief valve 112, and movable contactor 223 cooperating with and applying power to stationary contactor 224 and hence to wire 123, activates valve 121 when switch 650 is closed, providing power thereto and compressed air into chamber 510 for lowering diaphragm 520, excessive compressed air escaping through relief valve 122, during the interval 0–30 degrees of cam 211 rotation, corresponding to 0–10 seconds of time duration.

When movable contactor 215 is driven so it cooperates with stationary contactor 216, power is provided to wire 133, thereby activating valve 130 for draining a portion of the flushing fluid therethrough for filling loop 405, and movable contactor 219 simultaneously cooperates with stationary contactor 211, providing power to wire 143, thereby activating valve 140 and draining a portion of electrolyte fluid therethrough for filling loop 505, during the interval 60–120 degrees of cam 211 rotation, corresponding to 20–40 seconds of time duration. During the interval of 90–120 degrees of cam 211 rotation, corresponding to 30–40 seconds of time duration, movable contactor 223 will cooperate with stationary contactor 225, providing power to wire 73 which will activate valve 70, thereby draining contacts 15 from means 10.

During the interval 120–210 degrees of cam 211 rotation, corresponding to 40–70 seconds of time duration, movable contactor 226 will cooperate with stationary contactor 227, thereby providing power to wire 63 for activating valve 60 thereby providing gas 51 through T 12 into vessel 11 of means 10 for purging means 10. Gases will escape through vent 13.

During the interval 120–150 degrees of cam 211 rotation, corresponding to 40–50 seconds of time duration, movable contactor 228 will cooperate with stationary contactor 229, thereby providing power to wire 117, thereby activating valve 115 for providing compressed air into chamber 411 for raising diaphragm 420, excessive compressed air escaping through relief valve 116; movable contactor 231 will cooperate with stationary contactor 232 thereby providing power to wire 103 and activating valve 101 for providing compressed air to chamber 310 thereby lowering diaphgram 320, excessive compressed air escaping through relief valve 102; and movable contactor 234 will cooperate with stationary contactor 235 thereby providing power to wire 127 for activating valve 125 and providing compressed into air chamber 511 for raising diaphragm 520, excessive compressed air escaping through relief valve 126.

During the interval 240–270 degrees of cam 211 rotation, corresponding to 50–70 seconds of time duration, movable contactor 215 will cooperate with stationary contactor 217 providing power to wire 153 therby activating valve 150 for providing gas 51 to means 80, and movable contactor 219 will cooperate with stationary contactor 222 for providing power to wire 163 thereby activating valve 160 for providing gas 51 to means 90.

During the interval 210–240 degrees of cam 211 rotation corresponding to 70–80 seconds of time duration, movable contactor 228 will cooperate with stationary contactor 230, providing power to wire 271 for energizing amplifier 255 thereby activating the recording channel for the $Cu^{+2}$ ions.

During the interval 240–270 degrees of cam 211 rotation, corresponding to 80–90 seconds of time duration, movable contactor 231 will cooperate with stationary contactor 233, providing power to wire 272 for energizing amplifier 258 thereby activating the recording channel for $Fe^{+2}$.

During the interval 270–300 degrees of cam 211 rotation corresponding to 90–100 seconds of time duration, movable contactor 234 will cooperate with stationary contact 236 providing power to wire 273 for energizing amplifier 261, thereby activating the recording channel for $Fe^{+3}$ ions.

During the interval 300–330 degrees of cam 211 rotation corresponding to 100–110 seconds of time duration, movable contactor 215 will cooperate with stationary contactor 218 providing power to wire 107, thereby activating valve 105 and providing compressed air into chamber 311 thereby raising diaphragm 320, excessive compressed air escaping through relief valve 106.

During the interval 330–360 (zero) degrees of cam 211 rotation corresponding to 110–120 seconds of time duration, movable contactors 215, 219, 223, 226, 228, 231 and 234 will be returned to the initial operative strating point of the programmer. At completion of cam 211 rotation the high portion of cam 211 cooperates with roller 210 thereby breaking cooperating contacts 208 and 209, disconnecting power from motor 213 and from the movable contactors of the driven switch, and causing programmer to terminate the sampling cycle unless push button 201 is locked as hereinabove described, in which case when unlocked, the sampling cycle in progress will automatically terminate at conclusion thereof.

Mode 1 of sequence of operations performed by system using programmer 200 with switches 600 and 650 open Referring to all figures but particularly to FIGS. 1 and 2, this mode of operation is attached with switches 600 and 650 open so that contact pair 601 and 602 do not cooperate, and contact pair 651 and 652 do not cooperate. The sequence in which the programmer actuates the various components, the actions resulting within the system and period of duration of such actions are provided in Table 1, hereinbelow. Table 1 relates to a complete cycle of the system obtained when push button 201 is momentarily manually depressed. When more than one cycle is desired, locking of push button 201 is achieved in a manner hereinabove described, in which case the re-cycling of the components in accordance with Table 1 occurs and this push button is unlocked at which point the particular cycle which the programmer is executing at that time is automatically completed and the system is restored to its normal inoperative positions.

TABLE 1

| Programmer actuated component | Action resulting | Maximum duration of action or of fluid flow, seconds | |
|---|---|---|---|
| | | Start | Stop |
| Valve 111, not activated | Movable member 416 of means 30 remains in raised position | 0 | 10 |
| Valve 121, not activated | Movable member 516 of means 40 remains in raised position | 0 | 10 |
| Valve 130, activated | Loop 405 of means 30 does not fill up | 20 | 40 |
| Valve 140, activated | Loop 505 of means 40 does not fill up with electrolyte fluid 182 | 20 | 40 |
| Valve 70, activated | Contents 15, if any in means 10, drained by dumping the contents through valve 70 | 30 | 40 |
| Valve 60, activated | Means 10 purged with gas 51 | 40 | 70 |
| Valve 115, activated | Movable member 416 of means 30 remains in raised portion | 40 | 50 |
| Valve 101, activated | Movable member 316 of means 20 is lowered transferring an aliquot of the fluid stream residual in opening 318, | 40 | 50 |
| Valve 125, activated | Movable member 516 of means 40 remains in raised position | 40 | 50 |
| Valve 160, activated | Gas 51 and vapors of fluid 92 flow through means 40 into means 10 | 50 | 70 |
| Valve 150, activated | Gas 51 and vapors of fluid 82 flow through means 30 impelling the aliquot from means 20 into means 10; aliquot, gas 51, and vapors of fluid 82 flowing into means 10. | 50 | 70 |
| Amplifier 255, energized | Channel 1 activated obtaining analysis of $Cu^{+2}$ ion concentration | 70 | 80 |
| Amplifier 258, energized | Channel 2 activated obtaining analysis of $Fe^{+2}$ ion concentration | 80 | 19 |
| Amplifier 261, energized | Channel 3 activated obtaining analysis of $Fe^{+3}$ ion concentration | 90 | 100 |
| Valve 105, activated | Movable member 316 of means 20 is raised thereby restoring flow of fluid stream to means 20 and return of said stream back to fluid stream origin. | 100 | 100 |

Therefore, it may be concluded that a programmed method of analysis of a fluid stream wherein first and second fluid handling means are utilized in this method generally consist of steps of: (1) filling one portion of the second means with an aliquot of the fluid stream; (2) transferring the aliquot to another portion of the second means; (3) impelling aliquot by a flushing fluid, thereby transferring the flushing fluid and the aliquot into the first means; and (4) sensing the ion concentration of the fluids within the first means in a programmed analysis of the fluids.

Mode 2 of sequene of operations performed by system using programmer 200 with switch 600 closed and switch 650 opened Referring to all figures but particularly to FIGS. 1 and 2, the mode of operations is established with switch 600 closed and 650 opened so that contact pair 601 and 602 cooperate and contact pair 651 and 652 do not cooperate. The sequence in which the programmer actuates the various components, the actions resulting within the system and the periods of duration of such actions are provided in Table 2 hereinbelow. Table 2 relates to a complete cycle of the system obtained when push button 201 is momentarily manually depressed. When more than one cycle is desired, locking of push button 201 is achieved in a manner hereinabove described, in which case the recycling of the components in accordance with Table 2 occurs, and when this push button is unlocked during the cycle of the programmer, that particular cycle is automatically completed and the system is restored to its normal unoperated position.

Therefore, it may be concluded that in addition to the steps indicated under the caption of Mode 1 Sequence of Operations, there also occurs the step of: (5) injecting the flushing fluid flowing through a third means into the second means for transferring the aliquot to the first means under pressure and for mixing the flushing fluid with the aliquot within the first means.

Mode 3 of sequence of operations performed by system using programmer 200 with switches 600 and 650 closed Referring to all figures but particularly to FIGS. 1 and 2, this mode of operation is established with switches 600 and 650 closed, so that contact pair 601 and 602 cooperate, and contact pair 651 and 652 cooperate. The sequence in which the programmer actuates the various components, the actions resulting in the system, and the period of duration of such actions are provided in Table 3 hereinbelow. Table 3 relates to a complete cycle of the system obtained when push button 201 is momentarily manually depressed. When more than one cycle is desired, locking of push button 201 is achieved in a manner hereinabove described, in which case the recycling of the components in accordance with Table 3 occurs and this push button is unlocked at which point the particular cycle which the programmer is executing at that time is automatically completed and the system is restored to its normal unoperated position.

TABLE 2

| Programmer actuated component | Action resulting | Maximum duration of action or of fluid flow, seconds | |
|---|---|---|---|
| | | Start | Stop |
| Valve 111, activated | Movable member 416 of means 30 is lowered | 0 | 10 |
| Valve 121, not activated | Movable member 516 of means 40 remains in a raised position | 0 | 10 |
| Valve 130, activated | Loop 405 of means 30 filled with flushing fluid 172 by draining same through valve 130 | 20 | 40 |
| Valve 140, activated | Loop 505 of means 40 does not fill up with electrolyte fluid 182 | 20 | 40 |
| Valve 70, activated | Contents 15, if any in means 10, drained by dumping the contents through valve 70 | 30 | 40 |
| Valve 60, activated | Means 10 purged with gas 51 | 40 | 70 |
| Valve 115, activated | Movable member 416 of means 30 is raised transferring portions of flushing fluid 172 in readiness for being impelled through means 30. | 40 | 50 |
| Valve 101, activated | Movable member 316 of means 20 is lowered transferring ana liquot of the fluid stream which is residual in opening 318. | 40 | 50 |
| Valve 125, activated | Movable member 516 of means 40 remains in raised position | 40 | 50 |
| Valve 160, activated | Gas 51 and vapors of fluid 92 flow through means 40 into means 10 | 50 | 70 |
| Valve 150, activated | Gas 51, vapor of fluid 82 and flushing fluid 172 residual in loop 405 flow through means 30 and impel the aliquot of the fluid stream from means 20, all fluids flowing into means 10. | 50 | 70 |
| Amplifier 255, energized | Channel 1 activated obtaining analysis of $Cu^{+2}$ ion concentration | 70 | 80 |
| Amplifier 258, energized | Channel 2 activated obtaining analysis of $Fe^{+2}$ ion concentration | 80 | 90 |
| Amplifier 261, energized | Channel 3 activated obtaining analysis of $Fe^{+2}$ ion concentration | 90 | 100 |
| Valve 105, activated | Movable member 316 of means 20 is raised thereby restoring flow of fluid stream to means 20 and return of said stream back to fluid stream origin. | 100 | 100 |

TABLE 3

| Programmer actuated component | Action resulting | Maximum duration of action or of fluid flow, seconds | |
|---|---|---|---|
| | | Start | Stop |
| Valve 111, activated | Movable member 416 of means 30 is lowered | 0 | 10 |
| Valve 121, activated | Movable member 516 of means 40 is lowered | 0 | 10 |
| Valve 130, activated | Loop 405 of means 30 is filled with flushing fluid 172 by draining same through valve 130 | 20 | 40 |
| Valve 140, activated | Loop 505 of means 30 is filled with electrolyte fluid 182 by draining same through valve 140 | 20 | 40 |
| Valve 70, activated | Contents 15, if any in means 10, drained by dumping the contents through valve 70 | 30 | 40 |
| Valve 60, activated | Means 10 purged with gas 51 | 40 | 70 |
| Valve 115, activated | Movable member 416 of means 30 is raised transferring portions of flushing fluid 172 in readiness for being impelled through means 30. | 40 | 50 |
| Valve 101, activated | Movable member 316 of means 20 is lowered transferring an aliquot of the fluid stream residual in opening 318. | 40 | 50 |
| Valve 125, activated | Movable member 516 of means 40 is raised transferring portions of electrolyte fluid 182 for being impelled through means 40. | 40 | 50 |
| Valve 160, activated | Gas 51, vapors of fluid 92, and electrolyte fluid 182 in loop 55 are transferred to means 10 | 50 | 70 |
| Valve 150, activated | Gas 51, vapors of fluid 82, and flushing fluid 172 residual in loop 405 flow through means 30 and impel the aliquot of the fluid stream from means 20, all fluids flowing into means 10. | 50 | 70 |
| Amplifier 255, energized | Channel 1 activated obtaining analysis of $Cu^{+2}$ ion concentration | 70 | 80 |
| Amplifier 258, energized | Channel 2 activated obtaining analysis of $Fe^{+2}$ ion concentration | 80 | 90 |
| Amplifier 261, energized | Channel 3 activated obtaining analysis of $Fe^{+3}$ ion concentration | 90 | 100 |
| Valve 105, activated | Movable member 316 of means 20 is raised thereby restoring flow of fluid stream to means 20 and return of said stream back to fluid stream origin. | 100 | 110 |

Therefore, it may be concluded that in addition to the steps indicated under captions of Modes 1 and 2 Sequence of Operations, there also occurs the step of: (6) injecting an electrolyte fluid flowing through a fourth means into the first means for mixing the electrolyte fluid with the flushing fluid and the aliquot in the first means, thereby improving the accuracy of the analysis.

In all of the three modes of operation described above, the compressed air supply is constantly providing compressed air to valves 101, 105, 111, 115, 121 and 125. When the programmer activates any of these valves in accordance with the sequences as indicated above, compressed air is supplied through these valves to the respective chambers within means 20, 30 and/or 40. Such compressed air within these chambers will activate the respective diaphragms for raising or lowering the movable members attached thereto for the periods of duration indicated in Tables 1, 2 and 3.

I claim:

1. In combination, a controlled apparatus for sampling a stream of fluid in order to subject the stream of fluid to analysis and having the capability of transporting at least a portion of the stream of fluid, wherein the apparatus utilizes a flushing, an electrolyte fluid and a gas comprising:

first means for retaining samples of at least some of said fluids;

second means interposable into at least a portion of said stream of fluid, said second means being connected to the first means for sampling an aliquot of said stream of fluid and for transferring said aliquot from the second to the first means;

means for providing a quantitative analysis of said aliquot which was transferred to said first means;

means for retaining said flushing fluid;

third means connected between said flushing fluid retaining means and said second means for enabling transfer of at least a portion of the flushing fluid from the third means to the second means thereby causing said flushing fluid to impel the aliquot into the first means in a mixture of the aliquot and the flushing fluid;

means for retaining said electrolyte fluid;

fourth means connected between said electrolyte fluid retaining means and said first means for providing at least a portion of the electrolyte fluid to said first means thereby mixing the electrolyte fluid portion with said aliquot and with the flushing fluid portion within said first means for improving the accuracy of said analysis; and fifth means retaining said gas under pressure connected to the third means for moving said flushing fluid through said apparatus.

2. The apparatus as stated in claim 1, including:

a programmer for controlling said apparatus; and sixth means connected between the first and fifth means and to said programmer for controlling the flow of said gas to the first means thereby mixing fluids within said first means or for preventing gravitational drain of said fluids from said first means.

3. The apparatus as stated in claim 2, including:

seventh means connected to the first means and to the programmer for retaining the mixed fluids in the first means when the sixth means is activated by the programmer or for draining said mixed fluids from said first means when the seventh means is activated by said programmer.

4. The apparatus as stated in claim 3, including:

eighth means adapted to contain a first fluid, said eighth means being connected to the third means by a connection between the eighth means and an entryway of the third means for preventing blockage of the entryway of the third means by virtue of the combination of portions of said first fluid and gas flowing through the entryway of said third means.

5. The apparatus as stated in claim 4, including:

ninth means adapted to contain a second fluid, said ninth means being connected to the fourth means by a connection between the ninth means and an entryway of the fourth means for preventing blockage of the entryway of the fourth means by virtue of the combination of portions of said second fluid and gas flowing through the entryway of said fourth means.

6. The apparatus as stated in claim 5, including:

a first valve connected between the fifth and eighth means and to the programmer for controlling the flow of said gas to said third means.

7. The apparatus as stated in claim 6, including:

a second valve connected between the fifth and ninth means and to the programmer for controlling the flow of said gas to said fourth means.

8. The apparatus as stated in claim 7, including:

tenth means connected to the second means and to the programmer for controlling the flow of the aliquot through the second means or for controlling the transfer of said aliquot to the first means.

9. The apparatus as stated in claim 8, including:

eleventh means connected to the third means and to the programmer for controlling the flow of the flushing fluid through the second means and to the first means.

10. The apparatus as stated in claim 9, including:

twelfth means connected to the fourth means and to the programmer for controlling the flow of electrolyte fluid through the fourth means and to the first means.

11. The apparatus as stated in claim 10, including:

thirteenth means connected to the third means and to the programmer for controlling the drainage of the flushing fluid from within the third means.

12. The apparatus as stated in claim 11, including:

fourteenth means connected to the fourth means and to the programmer for controlling the drainage of the electrolyte fluid from within the fourth means.

13. The apparatus as stated in claim 1:

said analysis means including a plurality of sensors and a common sensor which are responsive to the fluids within said first means, each of said plurality of sensors and the common sensor in combination being responsive to a specific ionic element for providing a quantitative measure of ion concentration outputs therefrom.

14. The apparatus as stated in claim 1 wherein said second means comprises:

a first body having a plurality of openings therein;

a first movable member within an aperture in said first body, said first movable member having openings therein corresponding to openings in said first body;

means containing flushing fluid connected to said second means; and a first activating member coupled to said first movable member for moving said first movable member so as to enable said flushing fluid to be passed through said second means when said first activating member is in a lowered position or to inhibit the flushing fluid flow through said second means when said first activating member is in a raised position.

15. The apparatus as stated in claim 1, wherein said third means comprises:

a second body having a plurality of openings therein;

a second movable member within an aperture in said body, said second movable member having openings therein corresponding to openings in said second body;

means containing flushing fluid connected to said third means; and a second activating member coupled to said second movable member for moving said second movable member so as to enable said flushing fluid to be passed through said third means when said second activating member is in a raised position or for directing the flow of said flushing fluid for draining thereof from said third means when said second activating member is in a lowered position.

16. The apparatus as stated in claim 1, wherein said fourth means comprises:
 a third body having a plurality of openings therein;
 a third movable member within an aperture in said body, said movable member having openings therein corresponding to the openings in said body;
 means containing an electrolyte connected to said fourth means; and
 a third activating member coupled to said third movable member for moving said third movable member so as to enable said electrolyte fluid to be passed through said fourth means when said third activating member is in a raised position or for directing the flow of said electrolyte fluid for draining thereof from said fourth means when said third activating member is in a lowered position.

References Cited
UNITED STATES PATENTS

| | | | |
|---|---|---|---|
| 2,989,377 | 6/1961 | Leisey | 23—230 |
| 2,253,049 | 8/1941 | Riche | 23—230 |

GERALD L. KAPLAN, Primary Examiner

U.S. Cl. X.R.

23—230, 253; 204—1 T; 324—29

UNITED STATES PATENT OFFICE
CERTIFICATE OF CORRECTION

PO-1050
(5/69)

Patent No. 3,654,113     Dated April 4, 1972

Inventor(s) Julius H. Bochinski

It is certified that error appears in the above-identified patent and that said Letters Patent are hereby corrected as shown below:

Claim 1, Column 19, line 24, after "flushing" and before "an" insert the word --fluid--

Signed and sealed this 29th day of August 1972.

(SEAL)
Attest:

EDWARD M. FLETCHER, JR.
Attesting Officer

ROBERT GOTTSCHALK
Commissioner of Patents